US009011275B2

(12) United States Patent
Hebert et al.

(10) Patent No.: US 9,011,275 B2
(45) Date of Patent: Apr. 21, 2015

(54) GOLF BALL WITH SINGLE THERMOPLASTIC COVER LAYER OF HETEROGENEOUS COMPOSITION

(71) Applicant: Acushnet Company, Fairhaven, MA (US)

(72) Inventors: Edmund A. Hebert, Mattapoisett, MA (US); Michael J. Sullivan, Barrington, RI (US); Donald A. Serino, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 145 days.

(21) Appl. No.: 13/913,718

(22) Filed: Jun. 10, 2013

(65) Prior Publication Data

US 2013/0270745 A1  Oct. 17, 2013

Related U.S. Application Data

(62) Division of application No. 12/904,311, filed on Oct. 14, 2010, now abandoned.

(51) Int. Cl.
*A63B 57/00* (2006.01)
*B29C 35/02* (2006.01)
*A63B 37/00* (2006.01)
*A63B 37/04* (2006.01)
*B29C 43/02* (2006.01)
*A63B 37/12* (2006.01)
*A63B 37/08* (2006.01)
*B29C 35/08* (2006.01)
*B29C 43/36* (2006.01)
*B29L 31/54* (2006.01)

(52) U.S. Cl.
CPC ......... *B29C 35/0261* (2013.01); *A63B 37/0003* (2013.01); *A63B 37/0024* (2013.01); *A63B 37/0031* (2013.01); *A63B 37/0033* (2013.01); *A63B 37/0036* (2013.01); *A63B 37/04* (2013.01); *A63B 37/12* (2013.01); *A63B 2037/087* (2013.01); *B29C 43/027* (2013.01); *B29C 2035/0822* (2013.01); *B29C 2043/3665* (2013.01); *B29L 2031/546* (2013.01)

(58) Field of Classification Search
USPC ......................... 473/378, 409; 264/275, 255
See application file for complete search history.

(56) References Cited

U.S. PATENT DOCUMENTS

| 5,328,959 | A | 7/1994 | Sullivan |
| 5,783,293 | A | 7/1998 | Lammi |
| 6,676,541 | B2 * | 1/2004 | Cavallaro et al. ............. 473/376 |
| 2011/0224023 | A1 * | 9/2011 | Tutmark ....................... 473/377 |

* cited by examiner

*Primary Examiner* — Raeann Gorden

(57) ABSTRACT

The present invention relates to a method of manufacturing a golf ball having a single cover layer of heterogeneous composition. One embodiment of the invention describes a method wherein a core, comprising one or more layers, has pre-molded hemispherical cover cups placed about the core and each cover cup has at least two layers of distinct resinous materials, and the cover cups are heated and compressed such that the resinous materials in the cover cups intermingle with each other to form a single heterogeneous cover layer.

7 Claims, 3 Drawing Sheets

"GOLF BALL WITH SINGLE THERMOPLASTIC COVER LAYER OF HETEROGENEOUS COMPOSITION"

This application is a divisional of U.S. application Ser. No. 12/904,311, filed on Oct. 14, 2010, the entirety of which is incorporated by reference herein.

FIELD OF INVENTION

The invention relates generally to golf balls, and more specifically, to a golf ball having a single cover layer that is comprised of a blend of two or more distinct resinous materials.

BACKGROUND OF THE INVENTION

It is well known that golf balls are typically constructed with a cover that tightly surrounds a core. It is typical for a golf ball core to have a solid construction or a wound construction and the methods of forming these cores are well known in the art. Traditionally, golf ball covers are formed from polymeric materials. For instance, golf balls have traditionally incorporated covers made of balata rubber, which may be a natural balata, a synthetic balata, or a blend of natural and synthetic balata.

Other golf balls have incorporated covers which are formed from synthetic polymeric materials such as polyolefins and in particular, polyethylene, polyurethanes, and ionic copolymers of olefins. The latter mentioned ionic copolymers of olefins were commercially introduced in the mid 1960's by E. I. Du Pont de Nemours & Co., Inc., Wilmington, Del. (DuPont) and sold under the trademark "SURLYN." Golf balls incorporating SURLYN covers are generally described in U.S. Pat. No. 3,454,280. Cover compositions that are based on SURLYN resins are advantageous in that the resulting covers are cut and abrasion resistant compared to the balata covers. While golf balls incorporating SURLYN resin covers are commonly known by players to be more cut resistant than balata covered balls, they traditionally tend to reduce the spin imparted to a golf ball and produce a less desirable "feel" as compared to a balata covered ball.

SURLYN resins sold by DuPont typically contain zinc, lithium, magnesium or sodium ions. A number of SURLYN resins, of varying physical properties, are sold by DuPont. The physical properties of these resins are described in technical bulletins that are readily available from DuPont. Mixtures of various SURLYN resins as cover stock materials are likewise highly advantageous. Suitable mixtures for use as cover materials are described in U.S. Pat. No. 3,819,768.

For purposes of control, golfers strike a golf ball in such a manner that the ball has substantial backspin. It is desirable that a golfer be able to impart backspin to a golf ball for purposes of controlling its flight and controlling the action of the ball upon landing on the ground. For example, substantial backspin will make the ball stop once it strikes the landing surface instead of bounding forward. The ability to impart back spin onto a golf ball is related to the deformation of the golf ball cover when struck with a golf club. Generally, the more deformable the cover is, the easier it is to impart spin to the balls. This is particularly true for short or wedge shots.

Thus, it is desirable to combine the properties of SURLYN covered golf balls with the properties of Balata covered golf balls. For example it is desirable to have less spin on a drive, such that the ball will have a "low spin trajectory". The result is that the ball does not climb like a typical high spin rate ball would, and the ball has substantial roll after it lands on the ground to provide maximum distance. On the other hand, for approach shots, i.e., short shots into the green, spin is critical to control the ball when it lands. With a high spin rate, the ball will stop or "sit" when it hits the green. Thus, with a high spin rate, the ball can be hit directly at the target. With a low spin rate, the ball often bounces off the green or "runs" off the green. Thus, it is desirable to have a high spin rate for approach shots into the green.

Further, it is desirable to combine the durability of SURLYN covered balls with the characteristics of balata covered balls.

Typically, the golf ball cover layer is formed by one of two processes. The first process includes the compression molding of hemispheres. First, two hemispherical covers, called half-shells, are injection molded. The hemispheres are then placed around a core and compression molded so that they fuse around the core and wherein dimples are imparted into the cover. The cover is then finished to remove any visible molding lines or residue. The second process, called the retractable pin injection molding process, involves injection molding of the cover directly around a core positioned on pins, removing the pins once the cover material surrounds the core, removing the covered core, and finishing it to form a completed golf ball. In both cover forming processes, the injection molding of the covers involves techniques known in the art. These techniques generally involve forcing melted material to substantially fill and take on the shape of a mold, thereby forming a cover or hemisphere. When the material is cool enough to substantially maintain the shape of the mold, it is ejected from the mold.

There are also many patents that are directed to golf balls having multiple cover layers. For example, U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having multiple layer covers, wherein the outer layer is molded over the inner layer and comprises a blend of balata and an elastomer where the inner layer is an ionomer resin.

U.S. Pat. No. 4,919,434 is directed towards a golf ball having a cover which comprises an inner layer and an outer layer each of which is a thermoplastic resin. Preferably the layers comprise thermoplastic resin materials that are capable of fusion bonding with each other.

U.S. Pat. No. 5,783,293 discloses a golf ball with a multi-layered cover formed by a co-injection molding process, wherein the golf ball cover comprises an inner and outer layer of a first material and an intermediate layer therebetween of a second material.

SUMMARY OF THE INVENTION

A golf ball comprised of a core and a cover, wherein the cover has an inner surface and an outer surface and is formed from a mixture of a first material and a second material that are a blend of two or more thermoplastic materials and a first percent of the first material on the outer surface is greater than a second percent of the second material on the outer surface.

An embodiment of the invention provides that the outer surface of the cover has a first hardness as measured on the surface thereof and the inner surface has a second hardness as measured on the surface thereof that is different from the first hardness and the cover has a first thickness near the outer surface and a second thickness measured from the outer surface to a 50/50 blend point within the cover; the ratio of the second thickness to the first is proportional to a melt flow of the first material. The properties of the cover may be varied by varying the melt flows of the first and second materials.

The materials selected for the cover of the golf ball golf ball are comprised of one or more polymers selected from the group consisting of partially or fully neutralized thermoplastic ionomers, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, a urea or hybrids, silicones and silicone copolymers, styrene block copolymers and blends thereof.

One embodiment of the invention presents an intermediate layer between the core and cover and which may comprise an inner surface and an outer surface and is formed from a mixture of a first material and a second material and a first percent of the first material on the outer surface is greater than a second percent of the second material on the outer surface.

An embodiment of the golf ball provides for a method of manufacturing the golf ball having a single cover layer of heterogeneous composition. One embodiment of the invention describes a method wherein a core, comprising one or more layers, has pre-molded hemispherical cover cups placed about the core and each cover cup has at least two layers of distinct resinous materials, and the cover cups are heated and compressed such that the resinous materials in the cover cups intermingle with each other to form a single cover layer comprised of a non-distinct blend of the materials.

In another embodiment the heating and compression is done by a conventional one-step golf ball compression molding process that heats at a temperature between about 300° F. to 600° F. The intermingling of the cups may be further promoted by the application ultrasonic energy, electromagnetic energy, or infrared radiation.

DETAILED DESCRIPTION OF THE INVENTION

In a conventional golf ball construction one or more distinct layers of material (either homogeneously blended or pure) are molded or cast about a golf ball core to create a golf ball component layer. Multiple molding steps are employed to mold a new layer or layers of a differing material to create a multilayered construction. These layers have distinct dimensional boundaries between them, and are intended to act as homogeneous entities and not to mesh or blend with each other. However, in the present invention, golf ball subcomponents are manufactured consisting of two or more thermoplastic material layers that are receptive to blending with each other at temperature. This subassembly part (known in the golf manufacturing art as a "cup") can then be incorporated into a conventional golf ball compression molding operation, just as cups of homogeneous construction are used in the art today.

Figure 1:
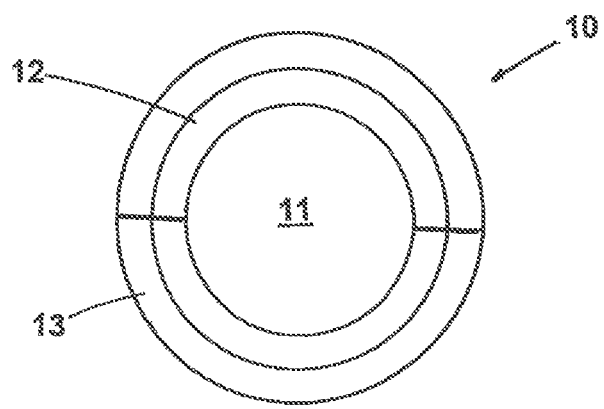
FIG. 1 is a golf ball of the present invention wherein a core is covered by two layers, each layer having distinct properties from the other layer.
Figure 2:
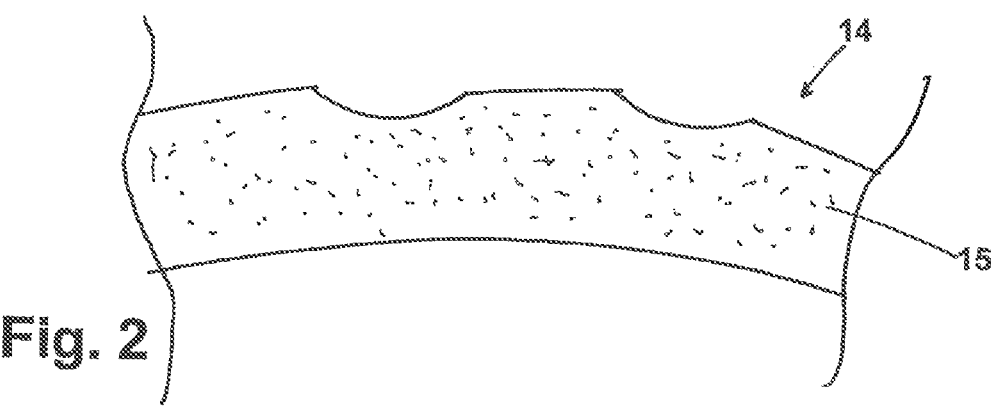
FIG. 2 is a cross-section of a resultant golf ball cover layer formed from two layers having relatively the same melt flow rates.

Referring to FIG. 1, a golf ball 10 is shown having a core 11 and a pair of inner cups 12 and a pair of outer cups 13 which may be provided by well known means in the industry. The two layers will have distinct physical properties but will have similar melt flow numbers which will allow the materials to intermingle when heat and compression is applied. The resulting cover is a single thermoplastic cover layer comprised of a dimensionally non-distinct blend of the selected materials, which have flowed together as a result of their melt properties and depicted by FIG. 2, which shows the resultant homogeneous cover 14 as substantially consisting of a homogeneous mixture 15.

Figure 3:
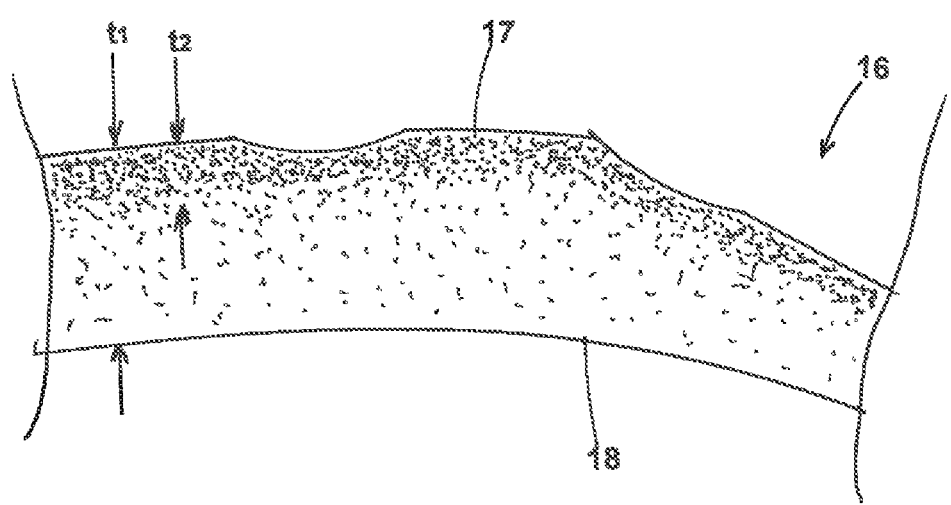
FIG. 3 is a cross-section of a resultant golf ball cover layer formed from two or more layers having different melt flow rates.

A novel aspect of the invention is shown in FIG. 3 wherein the outer cover 16 formed therein is resultant from employing inner and outer cup layers which have varying melt flows. In this embodiment the cover 16 results in an outer surface 17 having a first hardness as measured on the surface thereof and an inner surface 18 having a second hardness as measured on the surface thereof that is different from the first hardness and the resultant cover 16 has a first thickness t1 nearer the outer surface and a second thickness t2 measured from the outer surface to a 50/50 blend point within the cover 16; the ratio of the second thickness t2 to the first thickness t1 is proportional to a melt flow of the first material. The properties of the cover 16 can be altered by varying the melt flows of the first and second materials. Since the cover 16 has an inner surface and an outer surface and is formed from a mixture of a first material and a second material that are a blend of two or more thermoplastic materials and a first percent of the first material on the outer surface is greater than a second percent of the second material on the outer surface, the density near the outer surface 17 is different than that nearer the inner surface 18, which is also shown in FIG. 3. Normally, in most golf ball applications the outer surface 17 would preferably be softer than the inner surface 18.

There are numerous combinations of layers that may be applied within the concept and scope of the present invention. For instance, the cover layer described above could be an intermediate layer and a cover layer then placed about it. Many other combinations and methods of forming the inventive layer are described below.

Figure 4:
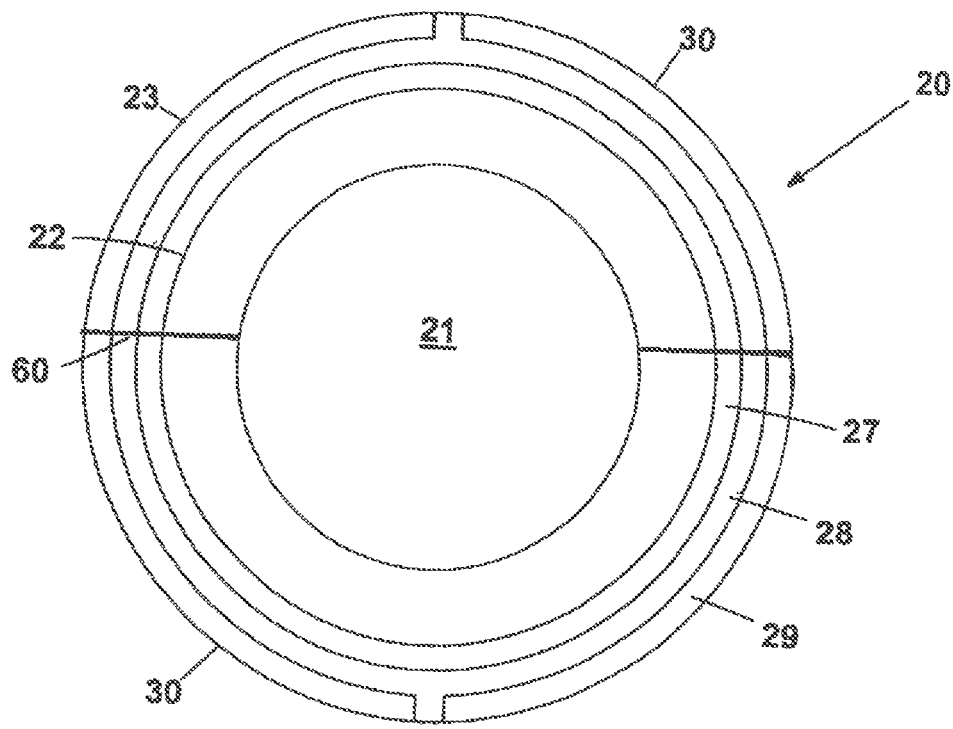
FIG. 4 is a golf ball according to FIG. 1, wherein the outer cover consists of three thin layers formed by a co-injection process.

Referring to FIG. 4, a golf ball 20 is shown having a core 21, an outer cover 23 and an inner cover 22, which could be also a dual core. The outer cover 23 consists of three thin layers, an inner 27, an intermediate 28 and an outer 29 formed by a co-injection molding machine and process, as described in U.S. Pat. No. 5,783,293, which employs a sandwich injection molding machine and produces a distinct two-material.

Figure 5:
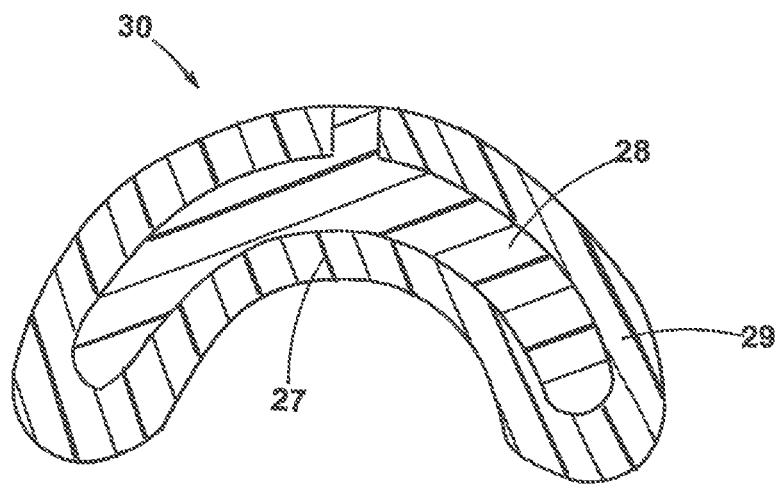
FIG. 5 is a resultant cross-sectional view of an outer cover comprising two materials of varying flow rates which have been allowed to mix into a single cover of varying densities and hardness.

The golf ball hemisphere 30 of the outer cover 23 is shown in FIG. 5. Multi-layer covers could also be prepared by incorporating other methods such as film laminates, rotational molding, blow molding, or similar. The layers 27, 28 and 29 may be as thin as 0.005 inches. In this embodiment layers 27 and 29 will be formed from one material while layer 28 is formed of a different material having different properties from the other and the amount of interaction between layers is a function of flow rates of the two materials. An inventive concept of the present invention is that the resulting golf ball 20 will have a cover hemisphere 23 that is then exposed to a conventional one-step golf ball compression molding process, wherein the layers 27, 28 and 29 are allowed to flow and intermesh with each other as temperature and pressure is applied in the compression molding process. This creates a single thermoplastic cover layer comprised of a dimensionally non-distinct blend of the selected materials, which have flowed together somewhat as a result of their melt properties. A greater concentration of a desired material might exist at the surface or towards the inner part of the ball, and the intermediate boundary between the two is comprised of a heterogeneous gradation of the two blended materials. While this embodiment shows a golf ball having an inner and outer layers 27, 29 of one material sandwiched about an intermediate layer 28, it is to be appreciated that the three layers could each be of a distinct material having three distinct physical properties.

Figure 6:
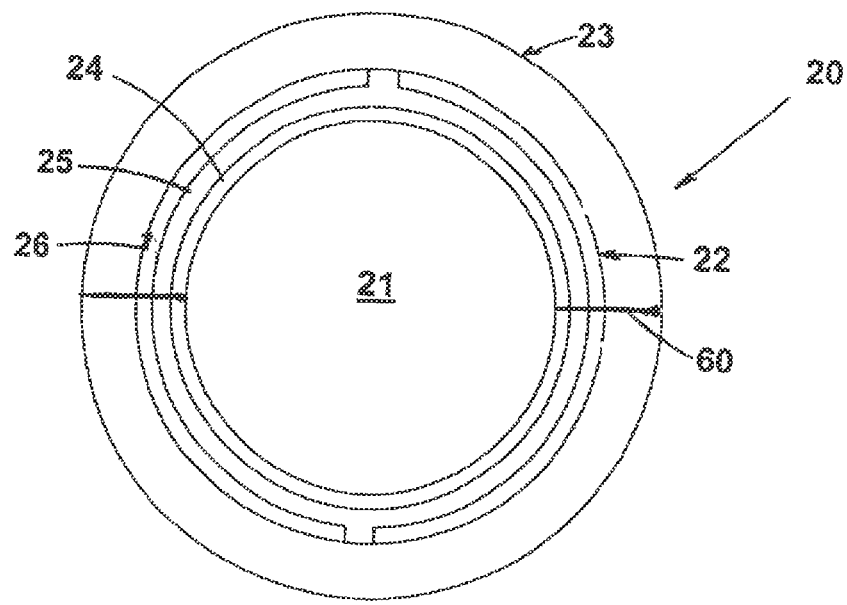
FIG. 6 is a golf ball according to an embodiment of the present invention disclosing a dual cover, with the inner cover consisting of three thin layers of two different materials formed by a co-injection molding process.

FIG. 6 illustrates a ball 30 wherein the cover features seen in FIG. 4 are utilized not in the outer cover layer 23 but in the inner layer 22 which also consists of an inner layer 24, an intermediate layer 25 and an outer layer 26.

As previously stated, the invention manufactures a cup with several distinct layers of material, but it is intended that the materials flow together once exposed to subsequent molding processes, creating a single layer with a heterogeneous gradation of materials that work well with each other. For example, a softer material might be applied at the outer surface of a ball to enhance short game spin rate performance, but this layer almost immediately begins transitioning into a harder material that aids in driver spin reduction. There is no visual distinction between the layers, and dimensionally, the "soft layer" or "hard layer" doesn't really exist—it's entirely a variable heterogeneous blend between the materials throughout the entire cover.

The transition point, and degree of intermixing of the materials, is dependant on the melt flow index and chemical composition of the materials selected, and the blending of the distinct materials may be controlled in this manner. But the intent is that the materials blend together fluidly and readily, in a dimensionally non-distinct way. This blending is accomplished by compression molding of a preformed cup or laminate comprising multiple layers at an elevated temperature that promotes intermingling of the materials comprising the layers of the cup or laminate. The cup or laminate comprises at least two and preferably at least three layers. In addition to the application of heat and pressure to promote at least partial mixing and/or intermingling of polymer chains (to form the previously described heterogeneous composition), ultrasonic energy, electromagnetic energy, IR or any means of molecular excitation may be used to further promote mixing and/or intermingling.

The compression method for forming the ball in FIG. 4, is accomplished by creating a "heterogeneous layer" by co-injecting mold half shells or cups having 3 or more distinct layers, with the innermost and outermost layers being the same material and sandwiching an intermediate layer or a second material. A core is then positioned inside an upper and a lower 3-layered cup and placed into a hot mold (about 300° F. to 600° F.) consisting of two female spherical half shells (with or without projections that will ultimately form the dimples of the ball) and the mold is closed. The time, temperatures, etc. and the degree of mixing or intermingling desired. A longer time and/or higher temperature will generally promote greater intermingling.

The intermingling of the materials may be done in a single step or multiple steps at increasing times and temperatures to create the golf ball properties desired. The goal is to create a single layer having a compositional gradient and therefore a hardness and modulus gradient. When using ionomeric materials it is proposed that choice of cation, melt flow, degree of neutralization, and type and level of ionic plasticizer (when used) are critical factors. For example, the use of smaller cations such as lithium are believed to promote greater mobility or "ion-hopping" from one polymer to another, thereby promoting greater intermingling. Further, the use of a more mobile cations such as amines, in addition to or as a replacement for a metal cation, may also promote greater mixing. Fatty acids, fatty acid salts and other plasticizers are more apt to "move" from one polymer to another, particularly it used in excess of the available cations present.

Figure 7:
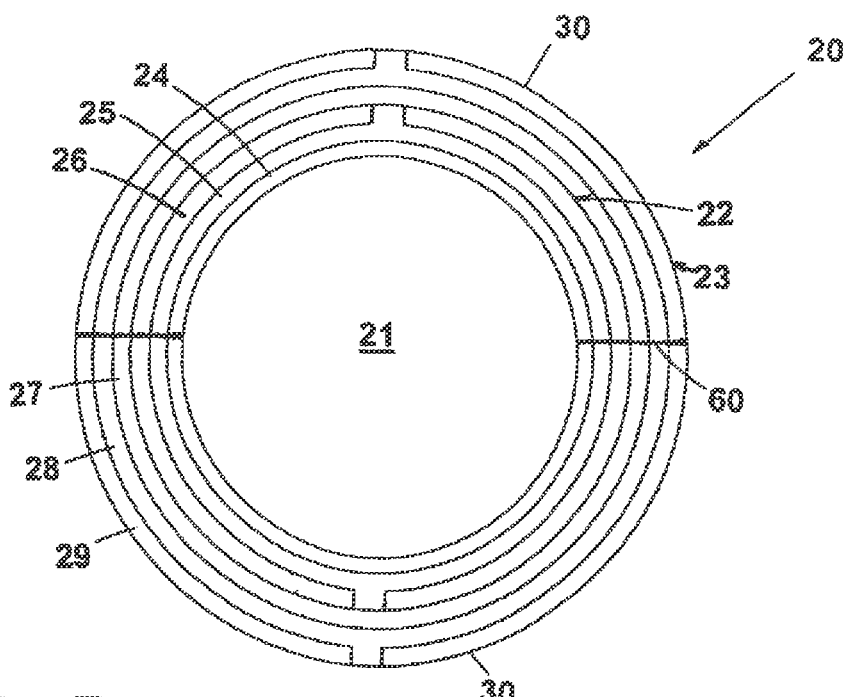
FIG. 7 is a golf ball wherein both the inner cover and outer covers consist of three thin layers of two different materials and are formed by a co-injection process.

Referring to FIG. 7, another embodiment of the invention is shown, wherein the completed golf ball 20 is presented. This embodiment employs the core 21 as being surrounded by two sets of cups, the inner sets 22 that comprises the three layer hemispheres placed over the core 21 on both sides of the ball equator 60, and outer sets 23 which comprise having three layer hemispheres placed over the inner sets. The inner sets 22 each consist of an inner layer 24 and outer layer 26 that are comprised of a first material and these layers sandwich an intermediate layer 25 which is comprised of a second material that is distinct in physical properties from the first material. The outer set of cups 23 each have three layer hemispheres consisting of an inner layer 27 and outer layer 29 that are comprised of a third material and these layers sandwiching an intermediate layer 28 comprised of a fourth material that is distinct in physical properties from the first material. The first and the third materials may be the same or different from each other. Also the second and the fourth materials may be the same or different from each other.

The inner hemispheres are compression molding onto a core that generally involves applying pressure and heat to the hemispheres and is known in the art. It is contemplated that the core 21 is a solid, polybutadiene type core, or a solid core having multiple layers or a wound core. It is suggested that first material and second material each comprise one or more polymers. Useful polymers include a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, an ethylene or propylene based polymer, a methyl acrylate, a methyl methacrylate polymer, a polycarbonate, a polyamide, a polyphenylene oxide, a polyether ketone, a polysulfone, an acrylonitrile butadiene polymer, an acrylic styrene-acrylonitrile polymer, a terphthalate polymer, an ethylenevinyl alcohol polymer, a tetrafluoroethylene polymer, a reinforced polymer, or blends thereof. As noted above, the first and second layers should be different polymers or be polymers that have different properties.

Most preferably the first material and second material are comprised of thermoplastic ionomers or of a balata rubber and a thermoplastic ionomer, respectively. Suitable thermoplastic ionomer resins include any number of olefinic based ionomers including SURLYN® and IOTEK® which are commercially available from DuPont and Exxon, respectively.

Among the preferred materials for first material and/or second material are ionomer resins obtained by providing a cross metallic bond to polymers of mono-olefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as an acrylate, e.g., methyl acrylate, iso-butyl acrylate or n-butyl acrylate, present in 1-60 (preferably 10-40, most preferably 10-25), weight percent of the polymer, and Y is ethylenically unsaturated organic acid, such as acrylic or methacrylic acid, present in 5-35 (preferably 10-35, most preferably 10-21) weight percent of the polymer, wherein the acid moiety is neutralized 1-90% (preferably at least 40%, most preferably at least about 60%) to form an ionomer by a cation such as lithium, sodium, potassium, magnesium, calcium, barium, lead, tin, zinc or aluminum, or a combination of such cations. Lithium, sodium, magnesium and/or zinc are preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described, e.g., in U.S. Pat. No. 3,262,272. Such ionomer resins are commercially available from DuPont Co. under the trade name SURLYN®.

Additionally, foamed polymeric materials, in particular, metallocene-based foam resins are suitable for use in the cover layers of the present invention.

Still further, the first or second materials can be comprised of balata rubber or of a synthetic balata.

In the present invention, first material has a melting point or heat of reaction (cure) temperature that is similar to that of second material.

The golf balls discussed in this present invention were constructed using a compression molding method. However, it will be apparent to those skilled in the art that the golf balls can also be constructed by the retractable pin injection molding process, which involves injection molding of the cover directly around a core positioned on pins. The pins are removed once the cover material surrounds the core and has solidified to the extent the core will not move. In this process, the compression molding seam 60 can be eliminated. After the cover materials have hardened, the covered core is removed and finished to form a completed golf ball. Based on the teachings herein, the necessary modifications to the standard retractable pin injection molding processes will be readily apparent to those skilled in the art.

Optionally, one or more of the inner layers may have materials that would work as moisture barrier layers that will protect against reduced COR values, due to moisture take-up by the core 21. Preferably one of the intermediate layers may serve as a moisture barrier layer, more preferably the intermediate layer will serve as the moisture barrier. The use of moisture barriers is described in U.S. Pat. No. 6,632,147, which is incorporated by reference herein in its entirety.

A moisture barrier should have a moisture vapor transmission rate that is less than that of the outer cover layer, and more preferably, less than the moisture vapor transmission rate of an ionomer resin such as Surlyn®, which has a rate in the range of about 0.45 to about 0.95 grams per mm/m.sup.2 per day. The moisture vapor transmission rate is defined as: the mass of moisture vapor that diffuses into a material of a given thickness per unit area per unit time. The preferred standards of measuring the moisture vapor transmission rate include: ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

The manipulation of moment of inertia via the filling (or foaming or otherwise reducing specific gravity) of the core and cover layers provide the opportunity to further improve upon distance and spin. The low specific gravity core or layers can be made from a number of suitable materials, so long as the low specific gravity contributes to the soft compression and resilience of the golf ball. The material can be from a thermosetting syntactic foam with hollow sphere fillers or microspheres in a polymeric matrix of epoxy, urethane, polyester or any suitable thermosetting binder, where the cured composition has a specific gravity less than 1.1 g/cc and preferably less than 1.0 g/cc. Additionally, any number of foamed or otherwise specific gravity reduced thermoplastic or thermosetting polymer compositions or foaming agents may also be used such as metallocene-catalyzed polymers and blends thereof described in U.S. Pat. Nos. 5,824,746 and 6,025,442 which are incorporated by reference herein in their entirety. Further, a thermoset polyurethane composition having a specific gravity or less than 1.3 g/cc such as a nucleated reaction injection molded or cast polyurethane may be used. Such a composition may result in a gas-filled or cellular solid layer.

As discussed in U.S. Pat. No. 5,971,870, which is incorporated by reference herein in its entirety, fillers may be or are typically in a finely divided form. For example, in a size generally less than about 20 mesh, preferably less than about 100 mesh U.S. standard size, except for fibers and flock, which are generally elongated, flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

Filler Type Sp. Gr. Comments Precipitated hydrated silica 2.0 1, 2 Clay 2.62 1, 2 Talc 2.85 1, 2 Asbestos 2.5 1, 2 Glass fibers 2.55 1, 2 Aramid fibers (KEVLAR.RTM.) 1.44 1, 2 Mica 2.8 1, 2 Calcium metasilicate 2.9 1, 2 Barium sulfate 4.6 1, 2 Zinc sulfide 4.1 1, 2 Lithopone 4.2-4.3 1, 2 Silicates 2.1 1, 2 Silicon carbide patelets 3.18 1, 2 Silicon carbide whiskers 3.2 1, 2 Tungsten carbide 15.6 1 Tungsten oxide 5.8 1 Diatomaceous earth 2.3 1, 2 Polyvinyl chloride 1.41 1, 2 Carbonates Calcium carbonate 2.71 1, 2 Magnesium carbonate 2.20 1, 2 Metals and Alloys (powders) Titanium 4.51 1 Tungsten 19.35 1 Aluminum 2.70 1 Bismuth 9.78 1 Nickel 8.90 1 Molybdenum 10.2 1 Iron 7.86 1 Steel 7.8-7.9 1 Lead 11.4 1, 2 Copper 8.94 1 Brass 8.2-8.4 1 Boron 2.34 1 Boron carbide whiskers 2.52 1, 2 Bronze 8.70-8.74 1 Cobalt 8.92 1 Beryllium 1.84 1 Zinc 7.14 1 Tin 7.31 1 Metal Oxides Zinc oxide 5.57 1, 2 Iron oxide 5.1 1, 2 Aluminum oxide 4.0 Titanium oxide 3.9-4.1 1, 2 Magnesium oxide 3.3-3.5 1, 2 Zirconium oxide 5.73 1, 2 Metal Stearates Zinc stearate 1.09 3, 4 Calcium stearate 1.03 3, 4 Barium stearate 1.23 3, 4 Lithium stearate 1.01 3, 4 Magnesium stearate 1.03 3, 4 Particulate carbonaceous materials Graphite 1.5-1.8 1, 2 Carbon black 1.8 1, 2 Natural bitumen 1.2-1.4 1, 2 Cotton flock 1.3-1.4 1, 2 Cellulose flock 1.15-1.5 1, 2 Leather fiber 1.2-1.4 1, 2 Micro balloons Glass 0.15-1.1 1, 2 Ceramic 0.2-0.7 1, 2 Fly ash 0.6-0.8 1, 2 Coupling Agents Adhesion Promoters Titanates 0.95-1.11 Zirconates 0.92-1.11 Silane 0.95-1.2 1 Particularly useful for adjusting density of the inner cover layer. 2 Particularly useful for adjusting flex modulus of the inner cover layer.

The present invention allows for a dual cover that may comprise four or six cover layers. The six cover layers may include as many as four different material compositions. Utilizing a diversity of base materials as well as the inclusion of the above density altering materials, a wide range of density and hardness gradients is achievable across an extremely wide spectrum.

While it is apparent that the illustrative embodiments of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A method of manufacturing a golf ball having a single cover layer of a heterogeneous composition, the method comprising:
   providing a core;
   placing a mating pair of hemispherical pre-molded cover cups about the core, each cup having at least two layers, wherein a first layer is comprised of a first resinous material having a first melt flow rate and a second layer is comprised of a second resinous material that is distinct from the first resinous material and has a second melt flow rate that is different than the first melt flow rate; and
   heating and compressing the cover cups such that the first and second resinous materials in the cover cups intermingle with each other to form a single heterogeneous cover layer.

2. The method of claim 1, wherein the heating and compression is done by a compression molding process.

3. The method of claim 1, wherein the heating is at a temperature between about 300° F. to 600° F.

4. The method of claim 1, further comprising the step of applying ultrasonic energy, electromagnetic energy, or infrared radiation.

5. The method of claim 1, wherein the pre-molded cover cups are formed by injection molding each layer and then mating the first layer over the second layer.

6. The method of claim 1, wherein the first and second resinous materials are comprised of one or more polymers selected from the group consisting of partially or fully neutralized thermoplastic ionomers, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, a urea or hybrids, silicones and silicone copolymers, styrene block copolymers and blends thereof.

7. A method of manufacturing a golf ball having an intermediate layer of a heterogeneous composition, the method comprising:
   providing a core;
   placing a mating pair of hemispherical pre-molded cups about the core, each cup having at least two layers, wherein a first layer is comprised of a first resinous material having a first melt flow rate and a second layer is comprised of a second resinous material that is distinct from the first resinous material and has a second melt flow rate that is different than the first melt flow rate; and
   heating and compressing the cups such that the first and second resinous materials in the cups intermingle with each other to form a heterogeneous intermediate layer, further comprising the step of forming a polyurethane cover over the heterogeneous intermediate layer.

* * * * *